March 29, 1966  P. KRAFT  3,242,562
METHOD FOR CONNECTING SURFACES OF ONE OR MORE
MEMBERS MADE FROM METAL FILAMENTS
Filed April 9, 1964  2 Sheets-Sheet 2

INVENTOR
PAUL KRAFT
BY
Harness, Dickey & Pierce
ATTORNEYS 3,242,562
METHOD FOR CONNECTING SURFACES OF ONE OR MORE MEMBERS MADE FROM METAL FILAMENTS
Paul Kraft, Geislingen, Steige, Germany, assignor, by mesne assignments, to Wurttembergische Metallwarenfabrik Geislingen, Steige, Germany
Filed Apr. 9, 1964, Ser. No. 358,558
Claims priority, application Germany, Apr. 10, 1963, J 23,528
1 Claim. (Cl. 29—419)

The invention relates to a method of connecting solid bodies formed from metal filaments.

It is already known to manufacture solid bodies from metal filaments, for example in the form of boards, blocks, sheets and the like, in order to be able to use them as pure fiber bodies for a great variety of industrial purposes or in order to coat them subsequently with an impregnating material which may be a synthetic material, a mineral, a ceramic material, or some other similar substance. The manufacture of these bodies can be carried out in a known manner by means of a suspension process, i.e. a process in which the metal filaments are first suspended in a liquid and in which the liquid is then passed through a sieve or filter, so that—just as in the manufacture of felt—an agglomerate of irregularly arranged filaments distributed uniformly throughout the body is formed. According to this process, endless bands can also be produced.

The described method of manufacture requires corresponding manufacturing plant or sintering arrangements, and this determines the size of the parts to be produced with respect to their overall dimensions, with the result that in general the external dimensions of the metal filament body is kept relatively small for technical and economic reasons. In practice however, it is frequently the case that metal filament bodies with larger surface dimensions than the manufacturing plant is capable of producing are required. In such a case, the only way is to form the larger member from a combination of a number of small parts, and in this, the type of connection plays a decisive role.

A further problem in the production of metal filament material lies in the difficulty of manufacturing hollow bodies, especially hollow cylinders, economically. Such bodies are used for example as air or fluid filters, as silencers on exhaust pipes, or for the lagging of tubes and pipes.

In the manufacture of such hollow members it is advantageous and particularly economical to start with a pre-formed board of metal filaments and then produce the desired hollow body from one or more boards by a bending process followed by a suitable process for securing the neighbouring edges.

One object of this invention is to provide substantial mutual connection between surfaces of solid bodies produced from metal filaments in an economical and technically advantageous manner.

Another object of this invention is to provide a method for connecting surfaces of one or more members made from metal filaments by compressing the parts serving as the connection surfaces of the or each solid body so that they have a low pore volume as compared with the original pore volume, and then securing the compressed surfaces by any suitable means.

Other objects and advantages of the invention will be apparent from the following detailed description thereof.

It has been discovered that in order to ensure that the connection between the end surfaces of metal filament bodies is suitable for trouble-free use and wide commercial application said bodies, such as boards produced from metal filaments, which in general have a pore volume of between 5% and 90%, are compressed under high pressure at the ends which are required to be connected, so strongly that a highly compressed, thinner portion is produced in which the filament material has a much lower pore volume. The surfaces which are compressed in this manner are arranged to abut against one another or to rest upon one another and are then connected to one another by welding or riveting, or by means of screws, pegs, pins, an adhesive, or some other known type of connection.

In order that the invention may be more readily understood, the method according to the invention and some particular types of connection used therein will now be described in detail by way of example with reference to the accompanying drawings, in which FIGURE 1 shows a rectangular board of metal filaments having a uniform thickness;

Figures 1, 2:
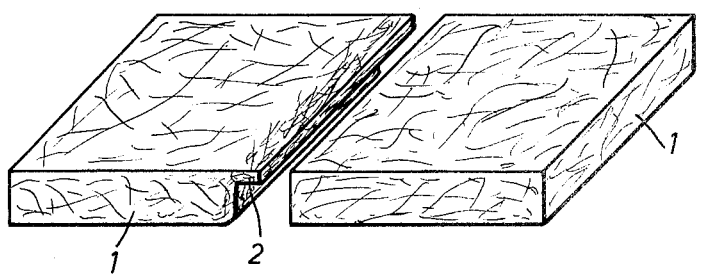
FIGURE 2 shows a board in which a connection portion of reduced pore volume has been formed at one edge by compression.
Figure 3:
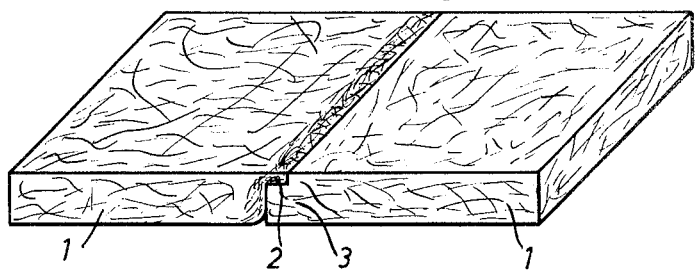
FIGURE 3 shows one method of connecting two boards by overlapping them.
Figure 4:
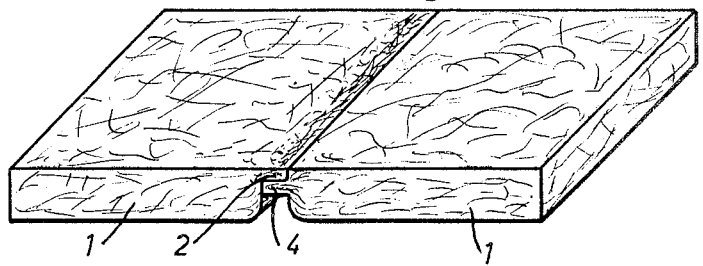
FIGURE 4 shows a further method of connecting two boards by overlapping.
Figure 5:
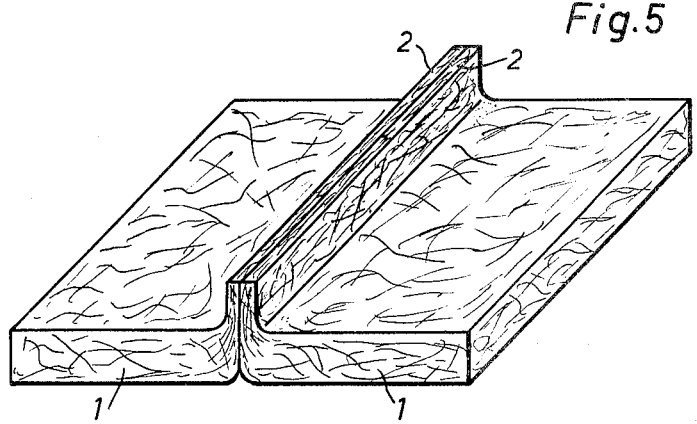
FIGURE 5 shows a method of connecting two boards by abutting compressed end portions thereof and then securing them.
Figure 6:
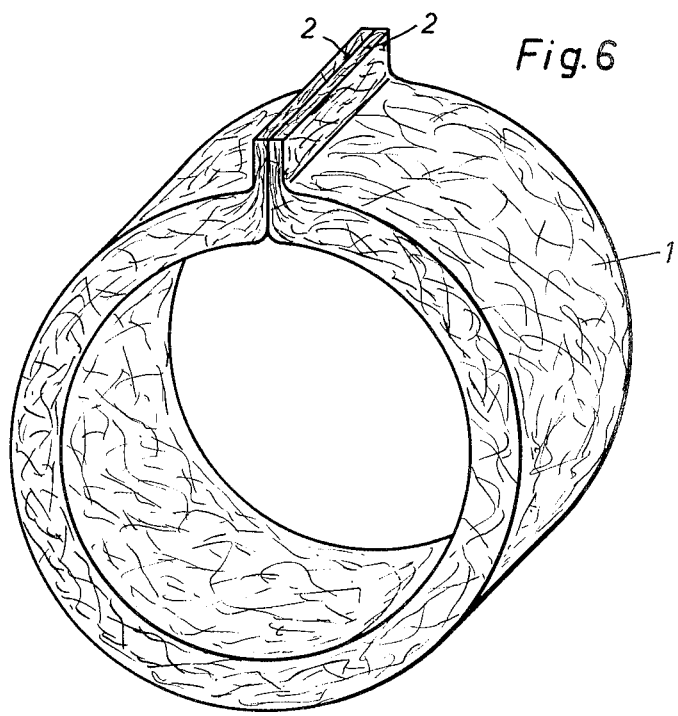
FIGURE 6 illustrates the manufacture of a cylindrical hollow body from a flat board by bending, and then securing the facing compressed ends of the board.

Referring to the drawings, the surface of a metal filament plate 1 (FIGURE 1) which is to serve as a connecting portion is compressed in a press or by means of suitable rollers under a pressure of up to 10 tons/cm.$^2$, or even more if the material requires it, with the result that the original pore volume is reduced, if necessary nearly to zero, so that a bridge, indicated at 2 in FIGURE 2, is formed.

The connection process then takes place in that the surfaces which have been prepared for connection by compression are overlapped or arranged to abut against one another and are subsequently welded, riveted, pegged, glued or pinned. The bridge can in fact be pressed to any thickness, as is shown by the reference numerals 2, 3 and 4. By the use of an inner intermediate layer or an outer additional layer of a suitable material corresponding to the filament material or of some other material which enhances the mechanical or other properties in the connecting process, the method enables the metal filament bodies to be adapted to any special commercial or industrial use.

Also, the dispersion or the strewing of filaments or powder of some other metal on or in the surfaces serving as connecting surfaces or between the metal filaments, is also possible. In this way, metal filaments which previously were not suitable for resistance welding are able to be welded.

What is claimed is:

A method for connecting a pair of members of metal filamentary material and of relatively large pore volume comprising the steps of compressing the end portions of said members to reduce the pore volume thereof to a minimum, dispersing metal particles suitable for resistance welding over said end portions, overlapping the compressed end portions, and resistance welding the overlapped end portions to one another.

References Cited by the Examiner

UNITED STATES PATENTS

| | | | |
|---|---|---|---|
| 854,099 | 5/1907 | Mead | 29—419 X |
| 1,790,178 | 1/1931 | Sutherland | 161—118 |
| 2,288,348 | 6/1942 | Funk | 219—117 X |
| 2,475,566 | 7/1949 | Karmazin | 29—483 |
| 2,793,718 | 5/1957 | Pajak | 29—475 |
| 3,017,698 | 1/1962 | Hambrecht | 29—163.5 |

WHITMORE A. WILTZ, *Primary Examiner.*

THOMAS H. EAGER, *Examiner.*